United States Patent [19]

Correia et al.

[11] 3,979,502

[45] Sept. 7, 1976

[54] METHOD OF ELIMINATING CHLOROACETYLENES PRESENT IN HYDROGEN CHLORIDE GAS

[75] Inventors: Yves Correia; Francois Muller, both of Saint-Auban, France

[73] Assignee: Rhone-Progil, Courbevoie, France

[22] Filed: Nov. 25, 1974

[21] Appl. No.: 526,748

[30] Foreign Application Priority Data
Nov. 27, 1973 France .............................. 73.42140

[52] U.S. Cl. .............................. 423/488; 423/481
[51] Int. Cl.² .......................................... C01B 7/08
[58] Field of Search ............................ 423/488, 481

[56] References Cited
UNITED STATES PATENTS

| | | | |
|---|---|---|---|
| 1,571,648 | 2/1926 | Schmidt | 423/488 |
| 2,196,246 | 4/1940 | Brown et al. | 423/488 |
| 2,357,095 | 8/1944 | Evans et al. | 423/488 X |
| 2,389,457 | 11/1945 | Pines et al. | 423/488 |
| 2,726,142 | 12/1955 | Reeve | 423/488 |
| 3,067,009 | 12/1962 | Murib et al. | 423/488 X |
| 3,314,753 | 4/1967 | Richert et al. | 423/488 X |
| 3,597,167 | 8/1971 | Marks et al. | 423/488 X |
| 3,832,306 | 8/1974 | Hackett et al. | 423/488 X |

OTHER PUBLICATIONS

Richter's "Textbook of Organic Chem.", 2nd Ed., 1943, pp. 50 & 51, John Wiley & Sons, Inc., N.Y.
B315,397, Jan. 1975, Rideout et al.

*Primary Examiner*—Edward Stern
*Attorney, Agent, or Firm*—McDougall, Hersh & Scott

[57] ABSTRACT

A method of eliminating chloroacetylenes present in small quantities in hydrogen chloride gas. The method comprises passing hydrogen chloride contaminated with chloroacetylenes over active carbon at a temperature from 50° to 250°C. The method of the invention can plainly be applied to the treatment of hydrogen chloride discharged from works where monochloroacetic acid is prepared, prior to compression of the hydrogen chloride.

5 Claims, No Drawings

METHOD OF ELIMINATING CHLOROACETYLENES PRESENT IN HYDROGEN CHLORIDE GAS

The method of the invention provides for the conversion of chloroacetylenes present in gases which are discharged from various reactions in organic chemistry and which essentially comprise hydrogen chloride.

Many reactions used in organic synthesis are known to involve the liberation of large quantities of hydrochloric acid in the gaseous state, which often has to be compressed for subsequent use either in or outside the factory where it is produced. The gases discharged from some of these reactions are also known to contain usually small quantities of chloroacetylenes; these compounds are known to explode very easily, so that there is a constant danger particularly when the gas is compressed.

It has so far never been possible to remove these compounds, in a simple manner, completely enough to eliminate this risk.

The invention provides a simple method of converting the chlorine-containing acetylene compounds so as to eliminate any danger of explosion due to these substances.

The method of the invention for eliminating chloroacetylenes present in hydrogen chloride gas comprises passing the impure acid over a bed of active carbon at a temperature from 50° to 250°C.

In addition to the hydrogen chloride and the mono and dichloroacetylenes, the mixture of gases to be treated may contain various chlorine-containing hydrocarbons, particularly from $C_2$ to $C_4$ and either saturated or not, inorganic compounds such as $N_2$, $H_2$, $CO_2$ and $SO_2$, and various other impurities which are frequently present in reactions accompanied by dehydrochlorination, e.g. those for the preparation of monochloroacetic acid.

The quantity of chloroacetylenes present should preferably not be more than 2% of the weight of hydrogen chloride, and optimum results are obtained when the total percentage of impurities, by weight, is less than 5% of the weight of hydrogen chloride.

No reagent is necessary other than the hydrogen chloride present in the mixtures.

The reactor in which the hydrogen chloride is purified should be filled with granules with a large surface area, of compounds which are not converted under the conditions used. A preferred filling comprises active carbon with a specific surface area from 700 to 1600 m²/g and preferably from 1200 to 1400 m²/g.

The filling may be impregnated with catalysts which are known to encourage hydrochlorination; these include Lewis acids selected from the group comprising mercuric, ferric, zinc and magnesium chlorides. The preferred proportion of these catalysts by weight relative to the carbon is from 1% to 5%. In a large nubmer of cases, optimum results are found to be obtained with non-impregnated carbon.

The temperature to which the mixture which has to be treated should be brought, in contact with the carbon, is from 50° to 250°C and preferably from 100° to 160°C.

In most cases the treatment is advantageously carried out at a pressure near atmospheric pressure so that the equipment can be kept simple, although a pressure which will not bring about any marked parasitic condensation may be exerted on the gases, e.g. in cases where the purifying reactor is included in a pressurized circuit.

The time for which the stream of gases remains in contact with the filling, expressed as the ratio of the volume occupied by the filling to the flow rate of the gases at the purifying temperature, must be from 5 to 70 seconds and preferably from 15 to 45 seconds.

The purifying apparatus advantageously comprises a nest of tubes, the internal diameter of the tubes being selected so as not to create any excessive pressure drops. The temperature may be maintained by circulating a heat-carrying fluid around the nest. This apparatus does not form part of the invention and may be replaced by other known arrangements without going beyond the scope of the invention.

The filling is preferably a fixed bed although it may be fluidized. In the case of the fixed bed the gases circulate downwardly.

The examples which follow are given to illustrate the method and do not restrict the scope of the invention.

EXAMPLE 1

A nest of tubes made of ordinary steel and comprising 100 tubes with an internal diameter of 80 mm, is kept at a temperature of 130° to 138°C by circulating a heat-carrying fluid, and is filled to a height of 1 m with carbon (of the same grade as Acticarbone AC 35 produced by CECA) with a specific surface area of 900 m²/g, the carbon being impregnated with 4% by weight mercuric chloride relative to the carbon. Gases discharged from works where monochloroacetic acid is prepared are fed into the nest of tubes after the acid has been condensed. In addition to the hydrogen chloride and relative to it, the gases contain 4300 parts per million by weight of monochloroacetylene and 3500 parts per million of dichloroacetylene, 2,000 parts per million of sulphur dioxide, 300 parts per million of nitrogen, 100 parts per million of vinylidene chloride, 50 parts per million of carbon tetrachloride and 3,000 parts per million of trichloroethylene. The average time of contact between the gases and the carbon is from 20 to 25 seconds. When the gases leave the reactor, after 380 hours of operation, the content of monochloroacetylene by weight is 15 parts per million and the content of dichloroacetylene is 3 parts per million relative to the total amount of gas flowing through. Any risk of explosion is thus completely eliminated. If the same procedure is followed in the same apparatus and under the same conditions but in the absence of carbon, the acetylene compounds are not found to disappear.

EXAMPLE 2

The same operation is carried out in a similar apparatus and using the same quantity of carbon but with a specific surface area of 1300 m²/g. The flow rate of the gases introduced is such that their dwell time in contact with the carbon at 130°C is 30 seconds. The impurities in the hydrogen chloride are as follows, by weight relative to the hydracid: 5,000 parts per million of sulphur dioxide, 3,000 parts per million of trichloroethylene, 1,400 parts per million of monochloroacetylene and 800 parts per million of dichloroacetylene. The gas discharged from the purifying reactor in an operation lasting some hundreds of hours contains, on average, only 2 to 6 parts per million of all chloroacetylenes taken together.

EXAMPLE 3

Hydrogen chloride gas containing, by weight relative to the hydracid, 7,000 ppm of monochloroacetylene, 2,000 ppm of dichloroacetylene, 4,000 ppm of $SO_2$ and 2,000 ppm of various chlorine-containing compounds consisting chiefly of trichloroethylene, is passed into the apparatus described above, over the same quantity of active carbon (of the same grade as Acticarbone AC 40 produced by CECA) at 140°C and with a dwell time of 30 seconds in contact with the carbon. After 1200 hours of operation, 90% of the initial monochloroacetylene and 99.9% of the dichloroacetylene have disappeared from the gases discharged.

EXAMPLE 4

In the apparatus described above a stream of hydrogen chloride containing as impurities 3,000 ppm of a mixture of symmetrical and asymmetrical dichloroethylenes, 100 ppm of vinyl chloride and 1,000 ppm of monochloroacetylene is passed over the same quantity of active carbon with a specific surface area of 1400 m²/g, impregnated with 2% of ferric chloride. At 140°C and with a dwell time of 38 seconds, the gas discharged contains only 20 ppm of monochloroacetylene.

We claim:

1. A method of eliminating monochloroacetylene and dichloroacetylene in an impure hydrogen chloride gas containing same and other gaseous contaminants essentially comprising the steps of:

a. subjecting the chloroacetylenes to a hydrochlorination reaction by passing the impure hydrogen chloride gas through a bed of active carbon at a temperature from 50° – 250°C, and wherein the quantities of chloroacetylenes is not more than 2% by weight of the hydrogen chloride gas and the total percentage of impurities by weight is less than 5% of the weight of the hydrogen chloride gas, and in which the active carbon has a surface over of 700 – 1600 m², and for a sufficient period of time until the hydrogen chloride gas leaving the reactor is essentially complete free of the said chloroacetylenes;

b. recovering the purified hydrogen chloride gas.

2. The method of claim 1, characterized in that the active carbon is impregnated with a hydrochlorinating catalyst.

3. The method of claim 2, characterized in that the hydrochlorinating catalyst is a Lewis acid selected from the group comprising mercuric, ferric, zinc and magnesium chlorides, and that it is used in a proportion of 1% to 5% by weight relative to the carbon.

4. A method as claimed in claim 1 in which the hydrochlorination reaction is carried out at a temperature within the range of 100° to 160°C.

5. The method as claimed in claim 1 in which the active carbon has a specific surface area within the range of 1200 to 1400 m²/g.

* * * * *